United States Patent
Klein et al.

(10) Patent No.: US 6,411,981 B1
(45) Date of Patent: Jun. 25, 2002

(54) METHOD AND APPARATUS FOR CONDUCTING A TRANSACTION BETWEEN HOMOGENEOUS AND/OR HETEROGENEOUS TRANSACTION PROCESSING SYSTEMS USING ASYNCHRONOUS PULL OF A TRANSACTION TRANSFER

(75) Inventors: Johannes Klein, San Francisco; Keith B. Evans, Fremont; Albert C. Gondi, Santa Clara; Sitaram V. Lanka, Mountain View; Roger J. Hansen, San Francisco, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/267,426

(22) Filed: Mar. 12, 1999

(51) Int. Cl.[7] .................................................. G06F 9/00
(52) U.S. Cl. ..................... 709/101; 709/227; 709/237; 707/10
(58) Field of Search ................................ 709/201, 101, 709/227, 237; 235/380; 713/201; 707/10

(56) References Cited

U.S. PATENT DOCUMENTS 5,793,028 A * 8/1998 Wagener et al. ............ 235/380
5,903,721 A * 5/1999 Sixtus ........................ 713/201
5,911,044 A * 6/1999 Lo et al. .................... 709/203
6,122,743 A * 8/2000 Shaffer et al. .............. 713/201
6,148,405 A * 11/2000 Liao et al. .................. 713/201

OTHER PUBLICATIONS

Shay, William A. , Understanding data communications and networks, 1994, PWS Publishing Co, p. 36.*

\* cited by examiner

Primary Examiner—Glenton B. Burgess
Assistant Examiner—Kimberly Flynn
(74) Attorney, Agent, or Firm—Leah Sherry; Oppenheimer Wolf & Donnelly

(57) ABSTRACT

A protocol for a transaction involving two homogeneous or two heterogeneous computing systems involves starting a transaction on one of the two systems, sending a request for participation in the transaction to an application resident on the other of the two systems, together with an identification and address of the transaction. Upon receipt of the request, the application will initiate a subordinate transaction through a resident (subordinate) transaction manager. The subordinate transaction manager will notify the Beginner transaction manager and at the same time cause the application to start work on the request. Later, the subordinate transaction, through the subordinate transaction manager participates in a two-phase commit protocol that concludes the transaction to ensure that all changes effected by the transaction are done, or none are done, i.e., the transaction is aborted.

2 Claims, 1 Drawing Sheet

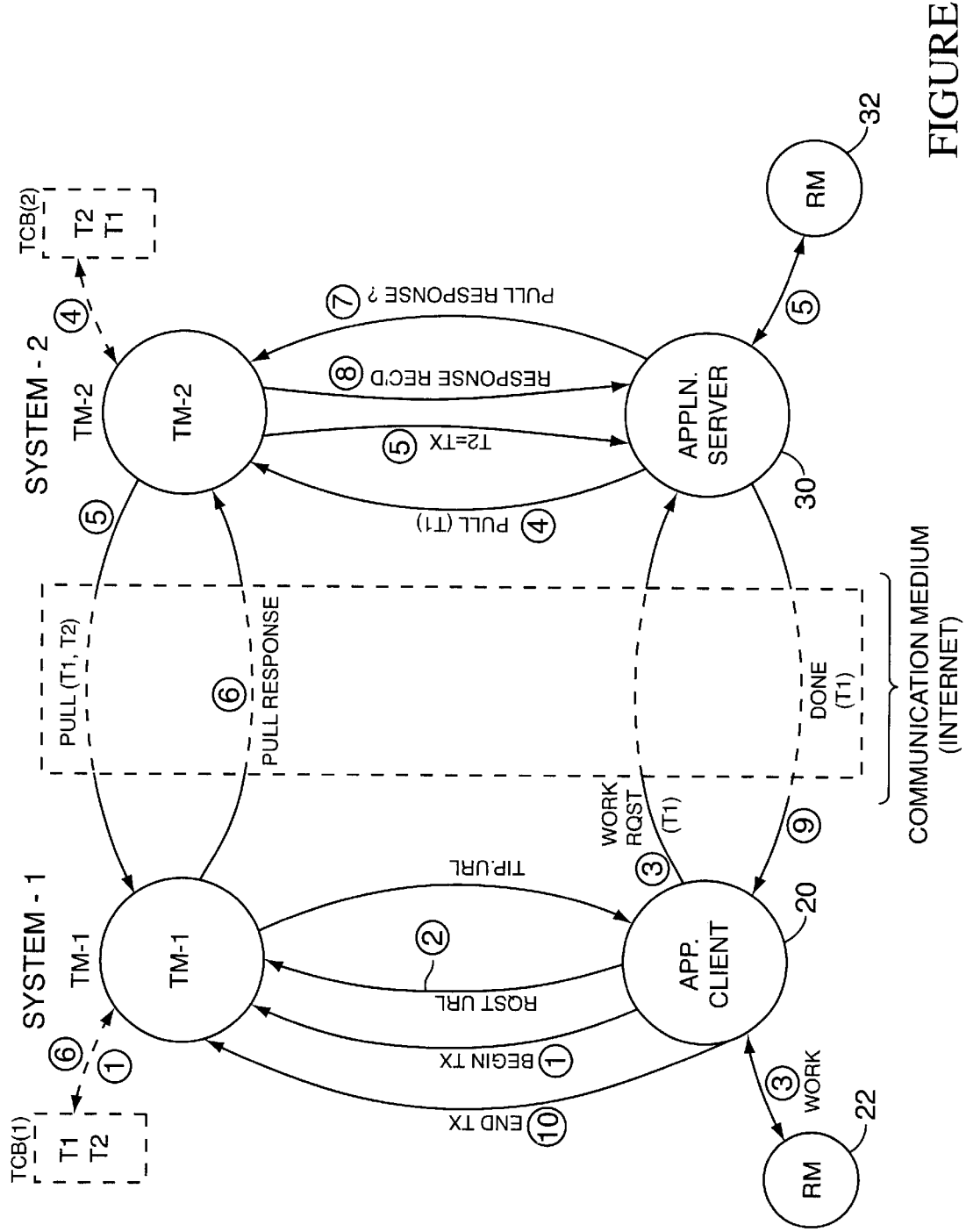
FIGURE

METHOD AND APPARATUS FOR CONDUCTING A TRANSACTION BETWEEN HOMOGENEOUS AND/OR HETEROGENEOUS TRANSACTION PROCESSING SYSTEMS USING ASYNCHRONOUS PULL OF A TRANSACTION TRANSFER

BACKGROUND OF THE INVENTION

The invention relates generally to transaction processing, and particularly to a two-phase commit (2PC) transaction protocol for use between transaction processing systems interconnected by a network.

Transaction processing, among other things, often involves a change in state of some form of information collection (e.g., "database"). In fact, a transaction is often defined as an explicitly delimited operation, or set of operations, that change or otherwise modify the content of the database from one consistent state to another. Changes or modifications are treated as a single unit in that all changes/modifications of a transaction are formed and made permanent (i.e., the transaction is "committed"), or none are made (i.e., the transaction is "aborted"). Failures occurring during the execution of a transaction may result in the transaction being aborted, and whatever partial changes were made to the database can be undone to return it to a consistent state.

A paradigm has been developed to insure that the conclusion of a transaction results in maintaining the consistency of the database. Known as the "two-phase commit" (2PC) protocol, this paradigm provides a procedure to coordinate the operation of resources whose participation has been enlisted in the transaction in a name that insures that the participating resources effect the desired change. For example, a transfer of funds from an account of one depositor to the account of another depositor of the same bank will result in a debit to the account of the first depositor, and a concomitant credit to the account of the second depositor, all of which can be handled by a transaction. The bank application will initiate the transaction, perhaps calling upon the services of a disk process resource to retrieve the account information of one depositor so that the debit can be made. Another disk process resource may be employed to retrieve the account of the other depositor to credit that account. In this example, and according to the 2PC protocol, the transaction will conclude with both disk process resources agreeing that the changes have been made according to the 2PC protocol.

Of course, the 2PC protocol is most often used in a homogeneous transaction processing system such as a single multi-tasking processor unit, or one with multiple processor units tightly interconnected in a cluster arrangement. Initiating transactions, and monitoring those transactions between different transaction processing systems, whether heterogeneous or homogeneous, can be a bit more difficult. However, recently there has been proposed a Transaction Internet Protocol (TIP), using the 2PC paradigm by a Transaction Internet Protocol working group of the Internet Engineering Task Force (IETF). This protocol has now been formally accepted as a formal standard (RFC) by the IETF. Attached hereto, as Appendix A is the final version of the IETF paper describing TIP and its requirements.

Briefly, the papers describe a simple 2PC protocol applicable to transactions involving resources in a distributed, Internet-connected transaction. Basically, two models are suggested: a "Push" model and "Pull" model. The Push model is initiated by an application on a first transaction processing system making a request of the transaction manager of that system to "export" a transaction to a second transaction monitoring system to perform some work on behalf of the application. The transaction manager of the first system will "push" the transaction to the second system by sending a message to the transaction manager of the second system. The message asks the second system to start a transaction as a subordinate of the first system, and return the name, for example "X," for that transaction on the second system together with the Internet address of the transaction. The application on the first system will then send a message to the desired resource (e.g., a disk process) on the second system, asking it to "do some work, and make it part of the transaction that your transaction manager already knows of by the name of X." Because the first system's transaction manager knows that it sent the transaction to the second system transaction manager, the first system transaction manager knows to involve the second system transaction manager in the 2PC process.

In the Pull model, the application on the first system merely sends a message to a resource on the second system, requesting that it "do some work, and make it part of a transaction that my transaction manager knows by the name of Y." The resource process on the second system then asks its transaction manager to enlist in the transaction Y. At that point, the transaction is locally initiated on the second system, and the second system transaction manager will "pull" the transaction (Y) over from the first system. As a result of this pull, the first system's transaction manager knows to involve the second system's transaction manager in the 2PC process.

In the Pull model, the resource must wait to perform the task requested of it by the application until the transaction manager of the second system receives the Pull response from the first system and then notifies the resource to proceed. Unfortunately, this pull of a transaction can be time consuming.

SUMMARY OF THE INVENTION

The present invention provides a modification to the Pull model of the Transaction Internet Protocol that allows for much more efficient and faster operation.

According to the present invention, at least first and second transaction processing systems are available, each including a transaction manager and various resources applicable for use in a transaction. The two systems are coupled for access to the Internet for communicating therebetween. An application program resident on the first system initiates a transaction, and as a part of that transaction, sends a request for work to be performed by a resource managed by a process (the recipient of the request) on the second system. The request will contain an identification of the transaction. The recipient process will notify its associated transaction manager which, in turn, will initiate a (second) transaction at the second system. When the second transaction is created, the transaction manager will instruct the recipient process to perform the requested activity under the aegis of the second transaction, and then notify the transaction manager of the first system of the second transaction together with the identification of the associated transaction at the first system. The transaction manager of the first system (now, the "Beginner" transaction manager), upon receiving the identification of the transaction started on the second system, will register that transaction as a subordinate to the transaction initiated at the first system, and will send a "Pull Response" to the transaction manager (now, the "Subordinate" transaction manager) on the second system that the registration has been completed. The recipient process, when its requested task is complete, will check with its (local) transaction manager, the Subordinate transaction manager, to determine if the Pull Response has been received. If so, the recipient process will respond as necessary to the application program of the first system. To conclude the transaction, the application program initiates and "End Transaction" to cause the transaction manager to initiate the two-phase commit protocol. This will include the transaction manager of the second system.

A principal advantage of the invention is that TIP technique is employed to perform a transaction over two systems connected by an Internet link in a manner that precludes a recipient process from having to wait until its associated (Subordinate) transaction manager receives back a Pull Response from the Beginner transaction manager of the first (requesting) system. Rather, while the second system is waiting for that Pull response, the associated recipient process has initiated the requested activity, and can be ready to reply to the requesting application when the Subordinate transaction manager receives the Pull Response from Beginner transaction manager on the first system.

These, and other aspects and advantages of the present invention, will become apparent to those skilled in this art upon reading of the following detailed description of the invention, which will be taken in conjunction with the accompanying figure.

BRIEF DESCRIPTION OF THE DRAWINGS

The FIGURE illustrates the steps taken in the Pull model of the Transaction Internet Protocol, according to the present invention.

DESCRIPTION OF THE PREFERRED EMBODIMENT

Referring now to the Figure, there is diagrammatically illustrated the colloquy that takes place between two transaction processing systems (SYSTEM-1, SYSTEM-2) to implement the Pull model of the Transaction Internet Protocol (TIP) constructed according to the present invention. As the Figure shows, two transaction processing systems, SYSTEM-1 and SYSTEM-2, each includes its own transaction manager (TM-1, TM-2) for tracking and coordinating, transactions initiated on the respective system. Not specifically shown in the Figure, but those skilled in the art will readily understand, are the appropriate communication mechanisms for establishing a communications session between SYSTEM-1 and SYSTEM-2 (e.g., modems, etc.) for an Internet connection. Also resident on the SYSTEM-1 is a representative application program or "client" 20 and perhaps a resource manager (and a representative associated resource) 22. Similarly, at SYSTEM-2 is an application server 30, and a resource manager (and associated resource) 32.

As an example of use, the SYSTEM could be a server that supports an Internet Web page for a travel agent. The Web page may be accessed by a user operating a conventional Web browser on a personal computer (not shown). Through a series of information-eliciting pages, the user can select dates that he/she will be in certain cities, and therefore will need hotel reservations, car reservations, etc. Once the information is proffered by the user, there may be a "submit" icon/button that is activated by a "point-and-click" function, or through some other means. According to the Pull model proposed by the standard announced by IETF, as implemented in a form modified according to the present invention, the following actions are taken (the numerals identifying each action set forth below correspond to the encircled numerals of the Figure):

1. The application client 20 will, as conventional, make a Begin Transaction call to the local transaction manager, TM-1. This will cause the transaction manager to set up the necessary data structures, such as the transaction control block (TCB(1)) data structure, that will be used to track and coordinate the transaction (T1).

2. The application client 20 will be designed to know it must enlist the services of a remote server. Accordingly, the application server 20 will request of the transaction manager, TM-1, an identification of the transaction (T1) just initiated, including the identification of the owner of that transaction (i.e., SYSTEM-1) in the form of a universal resource locator (URL) address (TIP URL address).

3. The application program 20 will now become a client in that it will establish an Internet connection with the SYSTEM-2 and transfer a work request (RQST) to the application server 30 of SYSTEM-2 via the Internet connection. RQST will include the identification of the transaction, including its Internet location, i.e., the TIP URL address. At the same time, the application client 20 may initiate work on its own system (SYSTEM-1) by a request to the local resource manager 22.

4. When the work request is received by the SYSTEM-2, and transferred to the application server 30, the application server 30 will retrieve the TIP URL from the RQST and pass this with an appropriate call to the local transaction manager, TM-2. The local transaction manager, TM-2, will, in response, create a local transaction (T2) under which the work performed at SYSTEM-2 will be tracked. The local transaction manager will create a TCB data structure—TCB(2)—where it stores information about this transaction T2, including its association with the transaction T1 on the SYSTEM 1.

5. The transaction manager TM-2 will instruct the application server 30 to perform the requested activity. The application server 30 is now operating in the context of the local transaction T2 created on the SYSTEM-2, and the application server 30 will then use the resource manager 32 to perform that activity. Then, the transaction manager TM-2 then sends a PULL command to the transaction manager TM-1 at SYSTEM-1, using the TIP URL of RQST as the address of that PULL command. The PULL command will also supply the identification of the (subordinate) transaction started at SYSTEM-2, i.e., T2, and the identification of the transaction started on SYSTEM-1, T1.

6. In response to the PULL command, the transaction manager, TM-1 ("Beginner" transaction manager), will "associate" the Subordinate transaction manager, TM-2, with the transaction T1 as a participant in that transaction. Once this is done, the Beginner transaction manager TM-1 responds to the Pull command with a "Pull Response" to the Subordinate transaction manager, TM-2, informing it that it has now been identified as a participant in the transaction T1.

Digressing for a moment, in the Transaction Internet Protocol promulgated by the IETF, the Subordinate transaction manager, TM-2, would wait for the reply of step 6, above, before releasing control to the application server 30 to perform the requested activity. The present invention, however, has the application server 30 released to perform requested activity concurrently with the wait for the reply (step 6).

7. When the resource manager 32 has performed the necessary activity ordered by the application server 30, it will check with the local (Subordinate) transaction manager, TM-2, to see if a Pull Response has been received at the second system.

8. The local (Subordinate) transaction manager TM-2 will reply back to the application server 30 only after the Pull Response has been received.

9. After receiving notification that the Pull Response has been received, the application server 30 will reply with send a Done message to the application client 20 of the SYSTEM-1, together with the requested information: here, the hotel bookings, if found.

10. The application 20, after receiving Done messages from the various subordinates it may have enlisted in the transaction, such as the application server 30, will then call End transaction, causing the Beginner transaction manager, TM-1, to initiate a 2PC protocol that will include, as a participant, the transaction manager TM-2 of SYSTEM-2. The transaction manager will, itself, initiate a 2PC protocol procedure (or whatever protocol is used by TM2), according to the local (subservient) transaction T2.

In summary there has been disclosed an improvement to the Transaction Internet Protocol proposed by the Transaction Internet Protocol working group of the Internet Engineering Task Force that provides reduces the time involved in conducting a transaction that includes an Internet colloquy to employ the services of a system external to that initiating the transaction. The invention precludes a recipient (server) process from having to wait until its associated (subordinate) transaction manager receives back a reply (Pull Response) from the Beginner transaction manager. Rather, while the second system is waiting for the Pull Response, the associated recipient (server) process has initiated the requested activity, and can be ready to reply to the requesting application when the associated transaction manager receives the Pull Response from the Beginner transaction manager on the first system.

What is claimed is:

1. A method of conducting a transaction over an Internet connection between first and second computing systems, the method including the steps of:

initiating a first transaction in the first computing system;

sending from the first computing system to the second computing system a work request that includes work to be done and an Internet address identifying the transaction;

initiating a second transaction in the second computing system and associating with the second transaction information concerning the first transaction;

registering the second transaction as a participant in the first transaction and at the same time initiating action on the work request at the second computer system;

checking for receipt of a response from the first computing system of an indication of registration of the second transaction;

transferring a done message from the second computer system to the first computer system indicating completion of the action on the work request;

initiating an end transaction on the first computer system, including transferring from the first computer system to the second computer system a Prepare signal with an identification of the first transaction and an Internet address of the first computer system;

transferring from the second computer system to the first computer system a Ready signal indicating that the action on the work request can be made persistent; and upon receipt of the Ready at the first computer system, sending a Commit signal to the second computer system to conclude the first and second transactions.

2. The method of claim 1, wherein the step sending the Commit signal is preceded by writing information concerning the first transaction to a data structure.

\* \* \* \* \*

UNITED STATES PATENT AND TRADEMARK OFFICE
CERTIFICATE OF CORRECTION

PATENT NO. : 6,411,981 B1
DATED : June 25, 2002
INVENTOR(S) : Klein et al.

It is certified that error appears in the above-identified patent and that said Letters Patent is hereby corrected as shown below:

<u>Column 4,</u>
Line 47, reads "action manager TM-2 then sends a PULL command to" it should read -- action manager TM-2 sends a PULL command to --.

<u>Column 5,</u>
Line 31, reads "neering Task Force that provides reduces the time involved" it should read -- neering Task Force that reduces the time involved --.

Signed and Sealed this

Twenty-eighth Day of January, 2003

JAMES E. ROGAN
*Director of the United States Patent and Trademark Office*